United States Patent
Luth et al.

(10) Patent No.: US 9,758,699 B2
(45) Date of Patent: Sep. 12, 2017

(54) METHOD FOR PROCESSING A THIN FILM LAYER

(71) Applicant: Xerox Corporation, Norwalk, CT (US)

(72) Inventors: Cory Daniel Luth, Wilsonville, OR (US); David Jonathan Houston, West Linn, OR (US)

(73) Assignee: XEROX CORPORATION, Norwalk, CT (US)

( * ) Notice: Subject to any disclaimer, the term of this patent is extended or adjusted under 35 U.S.C. 154(b) by 302 days.

(21) Appl. No.: 14/682,156

(22) Filed: Apr. 9, 2015

(65) Prior Publication Data
US 2016/0297203 A1    Oct. 13, 2016

(51) Int. Cl.
| | |
|---|---|
| *C09J 5/00* | (2006.01) |
| *B26D 7/01* | (2006.01) |
| *B41J 2/16* | (2006.01) |
| *B26D 3/08* | (2006.01) |

(52) U.S. Cl.
CPC ............. *C09J 5/00* (2013.01); *B26D 3/085* (2013.01); *B26D 7/015* (2013.01); *B41J 2/16* (2013.01); *B41J 2/164* (2013.01); *B41J 2/1623* (2013.01); *B41J 2/1631* (2013.01); *C09J 2205/302* (2013.01); *C09J 2205/31* (2013.01)

(58) Field of Classification Search
CPC ......... H01L 21/00; H01L 21/64; H01L 21/70; H01L 2121/00; B26D 3/085; B26D 7/015; B41J 2/16; B41J 2/1623; B41J 2/1631; B41J 2/164; C09J 5/00; C09J 2205/302; C09J 2205/31
See application file for complete search history.

(56) References Cited

U.S. PATENT DOCUMENTS

| | | | |
|---|---|---|---|
| 4,999,076 A | | 3/1991 | Incremona et al. |
| 5,501,929 A | * | 3/1996 | Kato ................. G03G 13/283 430/49.31 |
| 5,620,822 A | * | 4/1997 | Kato ................. G03G 13/28 430/49.31 |

(Continued)

FOREIGN PATENT DOCUMENTS

| | | | |
|---|---|---|---|
| JP | 11243209 A | * | 9/1999 |
| JP | 2010089344 A | * | 4/2010 |

OTHER PUBLICATIONS

Author Unknown, Dicing Tape, Wikipedia, http://en.wikipedia.org/wiki/Dicing_tape, Jan. 19, 2013, 1 page.

*Primary Examiner* — Carl Arbes
(74) *Attorney, Agent, or Firm* — MH2 Technology Law Group LLP

(57) ABSTRACT

A method for processing a thin film layer, for example to form an ink jet printhead, can include the use of an adhesive layer that can be converted from a first state having a first adhesive force to a second state having a second adhesive force, where the first state is stronger than the second state. Conversion from the first state to the second state can be performed using a suitable treatment. In an embodiment, the adhesive layer may be a thermal release material that is converted during a heat treatment. In another embodiment, the adhesive layer may be a layer that is sensitive to ultraviolet (UV) light, and is converted during exposure to UV light emitted by a UV light source.

20 Claims, 3 Drawing Sheets

(56) References Cited

U.S. PATENT DOCUMENTS

| | | | | |
|---|---|---|---|---|
| 6,066,424 | A * | 5/2000 | Kato | G03G 13/283 |
| | | | | 430/49.31 |
| 7,294,441 | B2 * | 11/2007 | Baker | G03G 15/0152 |
| | | | | 399/251 |
| 7,433,636 | B2 * | 10/2008 | Teschendorf | G03G 13/16 |
| | | | | 399/233 |
| 7,468,308 | B2 * | 12/2008 | Shimoda | G02F 1/13454 |
| | | | | 438/455 |
| 2005/0238967 | A1 * | 10/2005 | Rogers | B82Y 10/00 |
| | | | | 430/5 |
| 2007/0031617 | A1 | 2/2007 | Field | |

* cited by examiner

METHOD FOR PROCESSING A THIN FILM LAYER

TECHNICAL FIELD

The present teachings relate to the field of thin film processing and, more particularly, to a method for processing a flexible thin film layer.

BACKGROUND

Fabrication of electronic devices such as printheads for printing devices often includes the formation of a flexible polymer film at very precise tolerances. The completed film, for example a polyimide such as Kapton®, polyester, pressure-sensitive tapes, etc., can be used for various structures within an electronic device. For example, in an ink jet printhead, a thin film may be used along with other structures to channel ink through the printhead, or as an adhesive to bond adjacent printhead layers.

Mass producing a thin film having a uniform shape or geometry within tight tolerances is challenging, particularly for films having a thickness of one to two mils, or less. These thin films can easily stretch which distorts part geometries and can lead to scrap and increased costs. Securing a sheet of thin film material so that it remains stationary during cutting of several parts from the sheet can require complex tooling. Additionally, removal of waste material (slugs) can be difficult due to, for example, retention of the slugs by static electricity or adhesive that remains on the slugs or the part itself.

Various techniques are currently used to shape a thin film to desired dimensions. In one method, the sheet of thin film material is placed on top of a honeycomb panel and a vacuum is applied to the back side of the film. The film is then cut using, for example, a laser, mechanical blade, etc. As cutting occurs, the unwanted portions of the thin film and the slugs are extracted through the honeycomb panel, thereby uncovering and exposing the honeycomb panel. This exposure results in a reduction of the vacuum as material is cut away from the sheet, and a resulting decrease in the vacuum force applied to the back of the remaining film. As the vacuum applied to the remaining portion of the sheet tapers off, the sheet of thin film material can shift from its original position, and may be cut incorrectly. Thus the reduction in the vacuum force decreases the number of parts that may be cut at one time to ensure proper placement of the film during cutting.

Another method used to shape a thin film into a desired geometry includes the application of a pressure-sensitive adhesive tape to the sheet of thin film material. The pressure-sensitive adhesive tape secures the tape to the cutting fixture, and allows for processing of the thin film in the same way as that described above. In contrast to the use of a vacuum to secure the sheet, the adhesive secures the sheet of thin film material regardless of the number of sections that are cut and removed. However, during the removal of the thin film from the adhesive, the part may become deformed as a result of tensile forces placed on the part as the part is peeled from the adhesive during removal.

Yet another method used to shape a thin film includes a vacuum fixture and tooling having different manifolds for securing the part and extracting the slugs during sectioning of the thin film. The tooling may include relieved channels along the cutting path. While these fixtures may work well to provide properly shaped thin films, the fixture and tooling is extremely expensive and is custom for the shape and size of the part being produced. Design changes render the fixture obsolete and a new fixture must be designed and manufactured, which is expensive and may require large lead times.

A process for sectioning thin films into a desired shape within tight tolerances would be desirable.

SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

In an embodiment, a method for processing a thin film layer can include attaching a thin film layer to a carrier layer using an adhesive layer, wherein the adhesive layer comprises a material having a first adhesive force when in a first state and a second adhesive force when in a second state, and the first adhesive force is stronger than the second adhesive force, sectioning the thin film layer into at least one thin film section while the adhesive layer is in the first state, subsequent to sectioning the thin film layer, treating at least an adhesive layer portion of the adhesive layer that attaches the thin film section to the carrier layer to convert at least the adhesive layer portion from the first state to the second state, and with the adhesive layer portion in the second state, separating the thin film section from the carrier layer.

In another embodiment, a method for forming an ink jet printer can include processing a thin film layer using a method including attaching a thin film layer to a carrier layer using an adhesive layer, wherein the adhesive layer comprises a material having a first adhesive force when in a first state and a second adhesive force when in a second state, and the first adhesive force is stronger than the second adhesive force, sectioning the thin film layer into at least one thin film section while the adhesive layer is in the first state, subsequent to sectioning the thin film layer, treating at least an adhesive layer portion of the adhesive layer that attaches the thin film section to the carrier layer to convert at least the adhesive layer portion from the first state to the second state, and with the adhesive layer portion in the second state, separating the thin film section from the carrier layer. The method can further include forming an ink jet printhead, wherein the ink jet printhead comprises the thin film layer, and encasing the ink jet printhead comprising the thin film within an ink jet printer housing.

BRIEF DESCRIPTION OF THE DRAWINGS

The accompanying drawings, which are incorporated in, and constitute a part of this specification, illustrate embodiments of the present teachings and, together with the description, serve to explain the principles of the disclosure. In the figures.

It should be noted that some details of the FIGS. have been simplified and are drawn to facilitate understanding of the present teachings rather than to maintain strict structural accuracy, detail, and scale.

DETAILED DESCRIPTION

Reference will now be made in detail to exemplary embodiments of the present teachings, examples of which are illustrated in the accompanying drawings. Wherever possible, the same reference numbers will be used throughout the drawings to refer to the same or like parts.

As used herein, unless otherwise specified, the word "printer" encompasses any apparatus that performs a print outputting function for any purpose, such as a digital copier, bookmaking machine, facsimile machine, a multi-function machine, electrostatographic device, etc. Unless otherwise specified, the word "polymer" encompasses any one of a broad range of carbon-based compounds formed from long-chain molecules including thermoset polyimides, thermal releases, resins, polycarbonates, epoxies, and related compounds known to the art.

As described above, sectioning a sheet of flexible thin film material into a plurality of well-formed parts having a final geometry within design tolerances is difficult due to the delicate nature of the thin film material. Tensile forces placed on the thin film can stretch and deform the completed part to dimensions that are outside the range of acceptable tolerances. An embodiment of the present teachings can result in a well-formed part from a thin film material having a final geometry that is within allowable design tolerances.

An embodiment of the present teachings can include the formation of a sheet having a layer of thin film material, and may further include sectioning the sheet of thin film material into one or more parts having a desired shape. Various in-process structures which can be formed during an embodiment of the present teachings are depicted in FIGS. 1-6.

Figure 1:
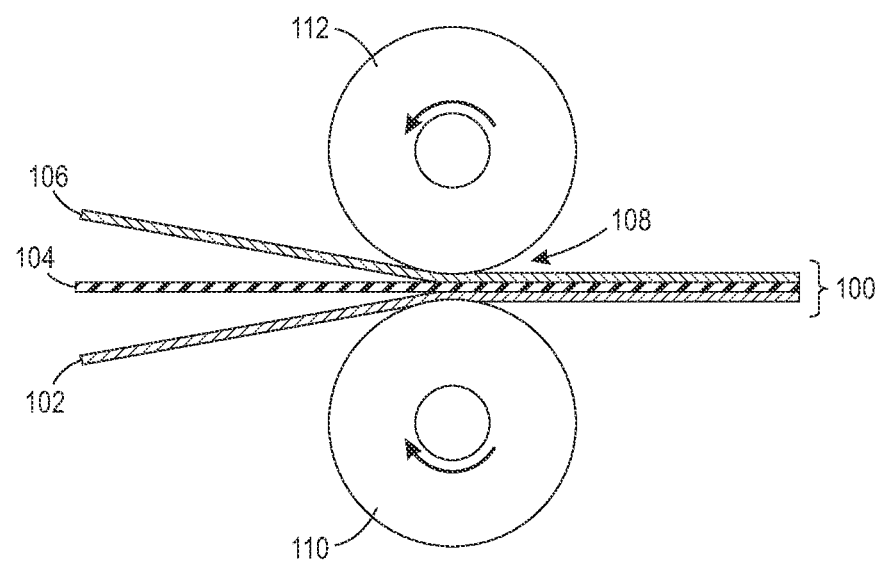
FIGS. 1 and 3-6 are cross sections.

FIG. 1 is a cross section depicting the formation of a laminated sheet 100, wherein the laminated sheet 100 includes a carrier (i.e., carrier layer) 102, an adhesive (i.e., adhesive layer) 104, and a thin film layer 106. The formation of the laminated sheet can be performed within a fusing nip 108 between a fuser roll 110 and a pressure roll 112 as depicted in FIG. 1. Other techniques for forming the laminated sheet 100 are contemplated.

In an embodiment, the carrier 102 can include a polymer such as polyolefin, polyethylene, polyvinyl chloride (PVC), or another polymer. The carrier 102 can have a thickness of from about 10 micrometers (μm) to about 300 μm, or from about 50 μm to about 100 μm.

The adhesive 104 can include a two-state adhesive having at least two states. The two-state adhesive transforms states when a suitable treatment is applied. The adhesive can have a high tack first state having a first adhesive force in its untreated state, and a lower tack (hereinafter, low tack) second state having a second adhesive force in its treated state, where the first adhesive force is stronger or higher than the second adhesive force (i.e., the second adhesive force is weaker or lower than the first adhesive force). The adhesive force may be measured using, for example, a pull-off tester. The adhesive can be converted from the first state to the second state using a suitable treatment.

In an embodiment, the adhesive 104 may be a thermal release material that has a reduced adhesive force (i.e., a lower tack) when exposed to elevated temperatures during a heat treatment. Sufficient thermal release materials include, for example, REVALPHA® thermal release tape, available from Nitto Denko America of Teaneck, N.J. In an embodiment, the thermal release adhesive 104 may have a first state that securely bonds to the thin film layer at a temperature of below about 30° C., and become flexible and have a second state that releasably bonds to the thin film at a temperature of from about 90° C. to about 150° C.

In another embodiment, the adhesive 104 can include an ultraviolet (UV) sensitive material that transforms from an untreated first higher tack state to a treated second lower tack state when exposed to UV light during a UV light treatment. Sufficient UV-sensitive materials include DU-2187G, available from Nitto Denko America. In either case, the adhesive 104 can have a thickness of from about 3 μm to about 10 μm, or from about 5 μm to about 8 μm. In this embodiment, the UV-sensitive adhesive may be irreversibly chemically altered during UV exposure, such that it cannot return to its untreated state.

The thin film layer 106 may be a flexible polymer, for example a polyimide such as Kapton®, a polyester, polymer, a plastic, a pressure-sensitive tape, etc. The thin film layer 106 can have a thickness of about 130 μm or less, or about 75 μm or less, or about 25 μm or less, or from about 25 μm to about 75 μm. The thin film layer 106 may be a flexible material that stretches under the application of a tension or a tensile force without breaking. The thin film layer 106 may further be a flexible material that can bend at least 90°, for example about 180° (i.e., can be folded back on itself), without breaking.

As depicted in FIG. 1, the carrier 102, the adhesive 104, and the thin film layer 106 may be laminated together under the application of pressure exerted within the fusing nip 108 between the fuser roll 112 and the pressure roll 110. While FIG. 1 depicts that the adhesive layer 104 is adhered to the carrier 102 within the fusing nip 108, it will be appreciated that the adhesive 104 and the carrier 102 may be laminated together prior to insertion into the fusing nip 108, while the thin film layer 106 is attached to the adhesive 104 within the fusing nip 108. The formation of laminated structures in a fusing nip, or using other lamination techniques, are known.

Figure 2:
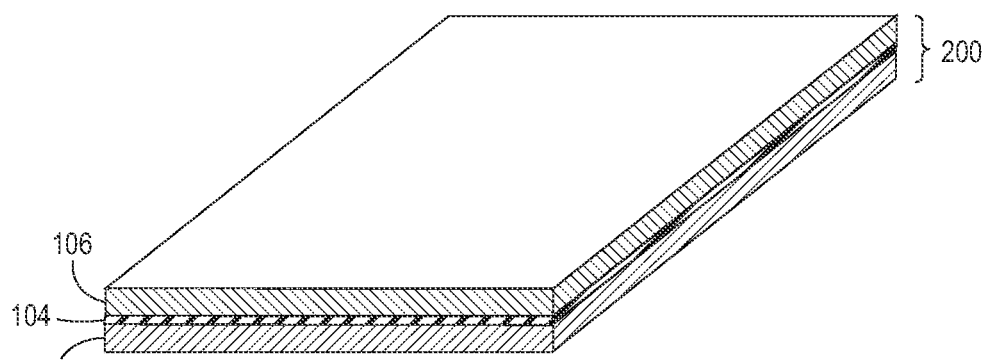
FIG. 2 is a perspective view, depicting embodiments of the present teachings.
Figure 3:
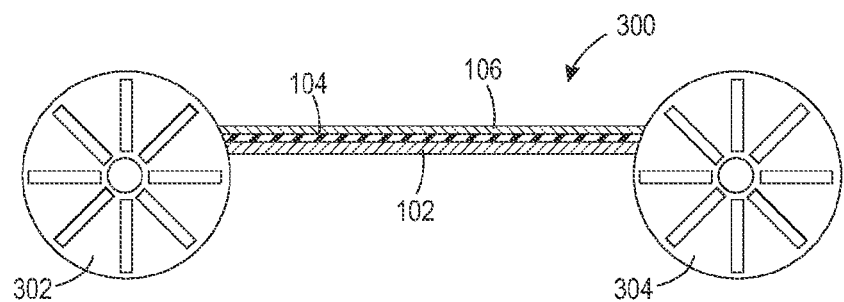
Figure 4:
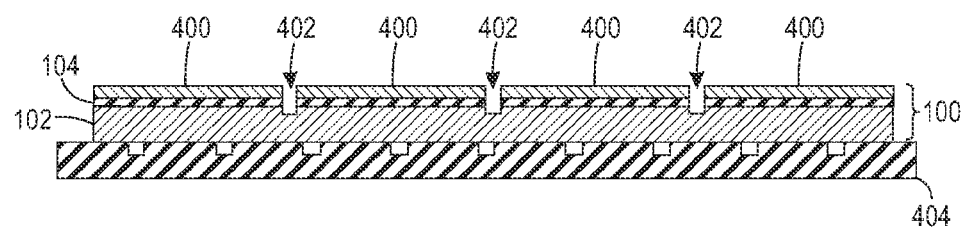

After forming the laminated sheet 100, individual parts can be sectioned from the thin film layer 106 using one or more cuts. In an embodiment, the laminated sheet 100 can be kiss cut using a technique known in the art, such as a blade, a laser, or another cutting apparatus (not individually depicted for simplicity) to section individual parts 400 from the thin film layer 106 using the one or more cuts 402 as depicted in FIG. 4. The kiss cutting process can cut through at least the entire thickness of the thin film layer 106 to form individual thin film parts or sections 400. The depicted process also cuts through the entire thickness of the adhesive layer 104, and only partially into the carrier layer 102. Subsequent to sectioning the thin film layer 106, the carrier layer 102 may be partially cut through its thickness, but the carrier layer 102 remains unsectioned. The sectioning or cutting process can be performed while the adhesive layer 104 is in a high tack state, and the adhesive layer 104 firmly secures the thin film layer 106 to the carrier 102. During the cutting process, the laminated sheet 100 can be aligned and held in place using, for example, a vacuum chuck 404. After cutting, one or more individual flat laminated sheets 200 may be formed as depicted in FIG. 2, and two or more flat laminated sheets 200 stored in a stack. In another embodiment, a continuous laminated sheet 300 may be formed and stored on a supply reel 302 as depicted in FIG. 3.

During use, the adhesive 104 is treated to transform the adhesive 104 from a higher tack state to a lower tack state.

As described above, the adhesive 104 has a first adhesive force when in the high tack state and a second adhesive force when in the low tack state, where the first adhesive force is greater than the second adhesive force. Thus the adhesive 104 secures the thin film layer 106 to the carrier during cutting and storage, but can be transformed to release the thin film sections 400.

Figure 5:
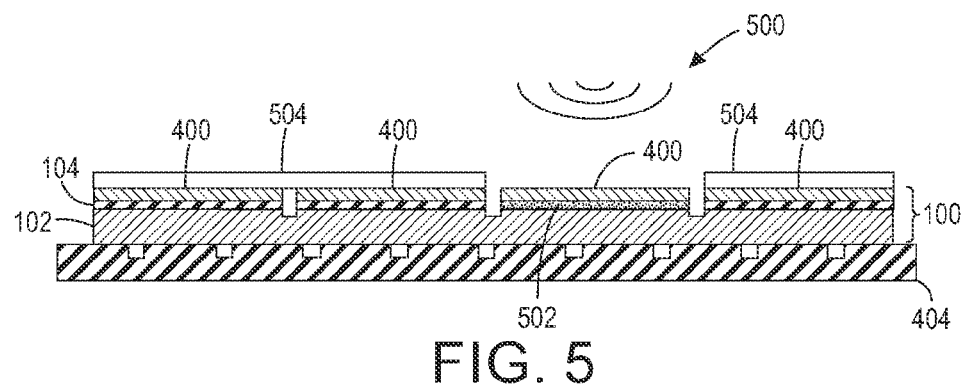

In an embodiment, the thin film sections 400 can be released en masse by exposing the entire sheet, such as sheet 100 in FIG. 4, to the treatment. In another embodiment, a single thin film section 400, or two or more thin film sections 400 (but fewer than all of the thin film sections 400) may be released. FIG. 5 depicts treatment of the laminated sheet 100 using a treatment source 500. If the adhesive 104 is a UV-sensitive adhesive, the treatment source 500 may be a UV light that radiates the exposed adhesive 104 and reduces the adhesive tack of the adhesive from a first adhesive force (adhesive 104) to a second adhesive force (adhesive 502), where the second adhesive force is less or weaker than the first adhesive force. If the adhesive 104 is a thermal release material, the treatment source 500 may be a heat source that heats the exposed adhesive layer portion and reduces the adhesive tack of the exposed adhesive from a first adhesive force (adhesive 104) to a second adhesive force (adhesive 502), where the second adhesive force is less or weaker than the first adhesive force. Treatment of the adhesive 104 may be performed from the top of the laminated sheet 100 through the thin film layer 400, from the back of the laminated sheet 100 through the carrier layer 102, or from both the front and back of the laminated sheet 100. During treatment, the sheet 100 may be held in place by the vacuum chuck 404, or using another technique.

In an embodiment, the treatment source 500 may be applied locally (i.e., localized) to only the thin film sections 400 that are to be released from the lower tack adhesive 502, while remaining areas are not exposed to the treatment source 500. In another embodiment a mask 504 may be placed on or over the thin film sections 400, and over the adhesive layer 104, to shield a portion of the thin film sections 400 and a portion of the adhesive layer 104 from the treatment source 500. An opening in the mask 500 allows exposure of one or more thin film sections 400, and more particularly exposure of the adhesive 104, to the treatment source 500. If the adhesive 104 is a UV-sensitive adhesive, the mask 502 may be an opaque light mask. If the adhesive layer 104 is a thermal release material, the mask 502 may be a heat sink that absorbs heat and/or otherwise reduces or prevents the applied heat from reaching the masked portions of the adhesive layer 104.

Figure 6:
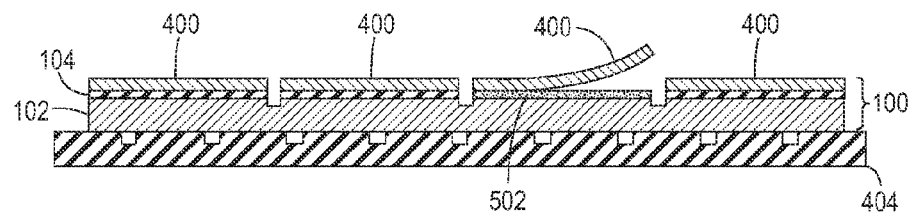

After treating the high tack adhesive 104 to transform into its treated state (adhesive 502), the thin film section 104 attached thereto is peeled, picked, or otherwise removed from the treated adhesive 502 as depicted in FIG. 6. The removal of the thin film section 104 may be performed, for example, manually by an operator or technician, automatically using a pick-and-place apparatus, or using another removal technique. During removal of the thin film section 400 of the thin film layer 106, the laminated sheet 100 may be held in place using a vacuum chuck 404, or another technique.

As depicted in FIG. 6, all of the thin film sections 400 of the thin film layer 106 may be detached from the carrier layer 102 without forming any slugs. As a result, there is no loss of vacuum force being applied to the back of the laminated sheet 100. In some conventional processes, the creation of slugs from a carrier layer and unwanted portions of the thin film layer, and the removal of the slugs and unwanted thin film portions during cutting, results in a decrease of a vacuum force being applied to the back of the remaining carrier layer. Additionally, the adhesive layer in its high tack, high adhesive force state firmly secures the thin film layer to the carrier layer, but after treating the high adhesive force adhesive to transform it to its lower tack, low adhesive force state, the thin film sections of thin film can be removed with a low tensile force which does not stretch and/or otherwise deform the cut sections of thin film. This is in contrast to some conventional techniques that use a single-state adhesive which can result in stretching and deformation of a film, particularly a very thin film having a thickness of 50 μm or less, during removal from the single-state adhesive. Further, the embodiments described above can include the use of a standard or stock vacuum chuck or other removal equipment that are not customized for the geometry of the thin film section. This is in contrast to some conventional techniques that use custom vacuum fixtures and tooling having different manifolds for securing the part and extracting the slugs during sectioning of the film.

When used within a printhead, the flexible thin film section 400 of the thin film layer 104 may be used, for example, as a dielectric layer that has no electrical functionality within the printhead. For example, the thin film section 400 may be used as a sealing layer to channel the flow of ink and prevent leakage between two adjacent layers, and/or as an adhesive layer that physically bonds two adjacent layers together.

Figure 7:
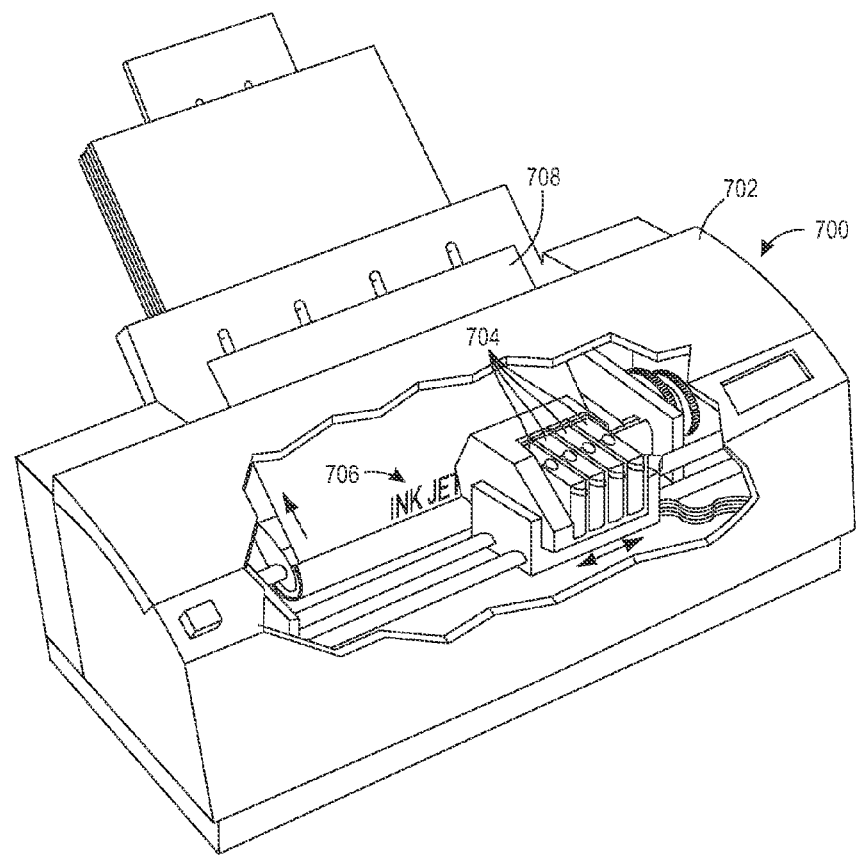
FIG. 7 is a perspective depiction of a printer including an ink jet printhead in accordance with an embodiment of the present teachings.

FIG. 7 depicts a printer 700, such as an ink jet printer, including a printer housing 702 into which at least one printhead 704 formed using an embodiment of the present teachings has been installed. The housing 702 may encase the printhead 704. During operation, ink 706 is ejected from one or more printheads 704. The printhead 704 is operated in accordance with digital instructions to create a desired image on a print medium 708 such as a paper sheet, plastic, etc. The printhead 704 may move back and forth relative to the print medium 708 in a scanning motion to generate the printed image swath by swath. Alternately, the printhead 704 may be held fixed and the print medium 708 moved relative to it, creating an image as wide as the printhead 704 in a single pass. The printhead 704 can be narrower than, or as wide as, the print medium 708. In another embodiment, the printhead 704 can print to an intermediate surface such as a rotating drum or belt (not depicted for simplicity) for subsequent transfer to a print medium.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

While the present teachings have been illustrated with respect to one or more implementations, alterations and/or modifications can be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It will be appreciated that structural components and/or processing stages can be added or existing structural components and/or processing stages can be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. As used herein, the term "one or more of" with respect to a listing of items such as, for example, A and B, means A alone, B alone, or A and B. The term "at least one of" is used to mean one or more of the listed items can be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. Finally, "exemplary" indicates the description is used as an example, rather than implying that it is an ideal. Other embodiments of the present teachings will be apparent to those skilled in the art from consideration of the specification and practice of the disclosure herein. It is intended that the specification and examples be considered as exemplary only, with a true scope and spirit of the present teachings being indicated by the following claims.

Terms of relative position as used in this application are defined based on a plane parallel to the conventional plane or working surface of a workpiece, regardless of the orientation of the workpiece. The term "horizontal" or "lateral" as used in this application is defined as a plane parallel to the conventional plane or working surface of a workpiece, regardless of the orientation of the workpiece. The term "vertical" refers to a direction perpendicular to the horizontal. Terms such as "on," "side" (as in "sidewall"), "higher," "lower," "over," "top," and "under" are defined with respect to the conventional plane or working surface being on the top surface of the workpiece, regardless of the orientation of the workpiece.

The invention claimed is:

1. A method for processing a thin film layer, comprising:
    attaching a thin film layer to a carrier layer using an adhesive layer, wherein the adhesive layer comprises a material having a first adhesive force when in a first state and a second adhesive force when in a second state, and the first adhesive force is stronger than the second adhesive force;
    rolling the thin film layer, the carrier layer, and the adhesive layer onto a supply reel subsequent to the attaching of the thin film layer to the carrier layer using the adhesive;
    sectioning the thin film layer into at least one thin film section while the adhesive layer is in the first state;
    subsequent to sectioning the thin film layer, treating at least an adhesive layer portion of the adhesive layer that attaches the thin film section to the carrier layer to convert at least the adhesive layer portion from the first state to the second state; and
    with the adhesive layer portion in the second state, separating the thin film section from the carrier layer.

2. The method of claim 1, wherein:
    the adhesive layer portion is a first adhesive layer portion of the adhesive layer;
    the adhesive layer further comprises a second adhesive layer portion; and
    the method further comprises placing a mask having an opening therein over the adhesive layer, wherein the opening in the mask exposes the first adhesive layer portion and covers the second adhesive layer portion during the treating of the first adhesive layer portion to reduce or prevent treatment of the second adhesive layer portion.

3. The method of claim 1, further comprising heating the adhesive layer portion during the treating to convert at least the adhesive layer portion from the first state to the second state.

4. The method of claim 1, further comprising exposing the adhesive layer portion to ultraviolet light during the treating to convert at least the adhesive layer portion from the first state to the second state.

5. The method of claim 1, wherein the attaching of the thin film layer to the carrier further comprises attaching the thin film layer having a thickness of 50 μm or less.

6. The method of claim 1, wherein the thin film layer, the adhesive layer, and the carrier layer form a laminated sheet, and the method further comprises kiss cutting the laminated sheet during the sectioning of the thin film layer into the at least one thin film section.

7. The method of claim 1, wherein the attaching comprises the attachment of the adhesive layer comprising a material selected from the group consisting of thermal release adhesive and ultraviolet sensitive adhesive.

8. The method of claim 1, wherein the attaching comprises the use of the thin film layer comprising a material selected from the group consisting of a polyimide, a polyester, a polymer, a plastic, and a pressure-sensitive tape.

9. The method of claim 1, wherein the attaching of the thin film layer to the carrier layer using the adhesive layer forms a flexible, flat laminated sheet.

10. The method of claim 1, further comprising performing the rolling of the thin film layer, the carrier layer, and the adhesive layer on to the supply reel subsequent to the sectioning of the thin film layer.

11. The method of claim 1, wherein the attaching of the thin film layer to the carrier layer using the adhesive layer comprises inserting the thin film layer, the carrier layer, and the adhesive layer into a fusing nip between a fuser roll and a pressure roll.

12. A method for forming an ink jet printer, comprising:
    processing a thin film layer using a method comprising:
        attaching a thin film layer to a carrier layer using an adhesive layer, wherein the adhesive layer comprises a material having a first adhesive force when in a first state and a second adhesive force when in a second state, and the first adhesive force is stronger than the second adhesive force;

sectioning the thin film layer into at least one thin film section while the adhesive layer is in the first state;

subsequent to sectioning the thin film layer, treating at least an adhesive layer portion of the adhesive layer that attaches the thin film section to the carrier layer to convert at least the adhesive layer portion from the first state to the second state; and with the adhesive layer portion in the second state, separating the thin film section from the carrier layer;

forming an ink jet printhead, wherein the ink jet printhead comprises the thin film layer; and encasing the ink jet printhead comprising the thin film within an ink jet printer housing.

13. The method of claim 12, wherein:

the adhesive layer portion is a first adhesive layer portion of the adhesive layer;

the adhesive layer further comprises a second adhesive layer portion; and the method further comprises placing a mask having an opening therein over the adhesive layer, wherein the opening in the mask exposes the first adhesive layer portion and covers the second adhesive layer portion during the treating of the first adhesive layer portion to reduce or prevent treatment of the second adhesive layer portion.

14. The method of claim 12, wherein the attaching of the thin film layer to the carrier further comprises attaching the thin film layer having a thickness of 50 µm or less.

15. The method of claim 12, further comprising kiss cutting the thin film layer during the sectioning of the thin film layer into at least one thin film section.

16. The method of claim 12, wherein the attaching of the thin film layer to the carrier layer using the adhesive layer forms a flexible, flat laminated sheet.

17. The method of claim 12, further comprising rolling the thin film layer, the carrier layer, and the adhesive layer onto a supply reel subsequent to the attaching of the thin film layer to the carrier layer using the adhesive.

18. The method of claim 12, further comprising rolling the thin film layer, the carrier layer, and the adhesive layer on to a supply reel subsequent to sectioning the thin film layer.

19. The method of claim 12, wherein the attaching of the thin film layer to the carrier layer using the adhesive layer comprises inserting the thin film layer, the carrier layer, and the adhesive layer into a fusing nip between a fuser roll and a pressure roll.

20. A method for processing a thin film layer, comprising:

attaching a thin film layer to a carrier layer using an adhesive layer, wherein:

the adhesive layer comprises a material having a first adhesive force when in a first state and a second adhesive force when in a second state, and the first adhesive force is stronger than the second adhesive force; and the attaching of the thin film layer to the carrier layer using the adhesive layer comprises inserting the thin film layer, the carrier layer, and the adhesive layer into a fusing nip between a fuser roll and a pressure roll;

sectioning the thin film layer into at least one thin film section while the adhesive layer is in the first state;

subsequent to sectioning the thin film layer, treating at least an adhesive layer portion of the adhesive layer that attaches the thin film section to the carrier layer to convert at least the adhesive layer portion from the first state to the second state; and with the adhesive layer portion in the second state, separating the thin film section from the carrier layer.

\* \* \* \* \*